Patented Sept. 17, 1935

2,014,450

UNITED STATES PATENT OFFICE 2,014,450

AZO DYE AND METHOD FOR ITS PREPARATION

Clifford Paine, Handforth, England, assignor to Imperial Chemical Industries Limited, a corporation of Great Britain No Drawing. Application July 22, 1933, Serial No. 681,803. In Great Britain August 16, 1932

10 Claims. (Cl. 260—81)

This invention relates to new azo dyes and more particularly refers to new disazo dyes having the following general formula:

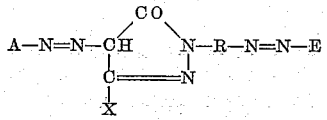

in which A represents the residue of diazotized dehydrothiotoluidine- or primuline-sulfonic acid, R represents an arylene nucleus, X represents a methyl or carboxylic acid group, and E represents the residue of an aminonaphthol-sulfonic acid or an N-substitution product thereof.

It is an object of this invention to produce new dyes having attractive shades. A further object is to produce dyes having satisfactory fastness properties. A still further object is to produce disazo dyes which are particularly efficacious in coloring cotton and regenerated cellulose, these shades being generally brown to orange-brown.

These objects are attained according to the herein described invention, which in its preferred embodiment comprises coupling a diazotized dehydrothiotoluidine- or primuline-sulfonic acid with a 1-aminoaryl-3-methyl-(or carboxyl)-5-pyrazolone, diazotizing the resulting aminoazo compound and coupling it with an aminonaphthol-sulfonic acid or an N-substitution product thereof. Coupling of this latter compound may take place in acid, neutral or alkaline solution.

The invention may be more readily understood by a consideration of the following illustrative examples, in which the quantities are stated in parts by weight:

Example 1

32.0 parts of dehydrothiotoluidine sulfonic acid were dissolved in 15.0 parts of 30% aqueous caustic soda and 600 parts of water. 35 parts of 20% aqueous sodium nitrite were then added and followed, at a temperature of 15-20° C. by 35 parts of hydrochloric acid (sp. gr. 1.16). Diazotization was allowed to proceed for one hour. The suspension of the diazo compound was then coupled by gradual addition to an ice-cold solution of 18.0 parts of 1(m-aminophenyl)-3-methyl-5-pyrazolone in 300 parts of water, 15.0 parts of 30% aqueous caustic soda and 30.0 parts of anhydrous sodium carbonate. Formation of the monoazo compound was rapid and after one hour the reaction mixture was heated to 80° C. and the coupling product isolated by the addition of 100 parts of common salt, followed by filtration. The monoazo compound was redissolved in 1000 parts of water and 25.0 parts of 30% aqueous caustic soda at a temperature of 70° C., 35 parts of 30% aqueous sodium nitrite were added and the mixture cooled to 25° C., when 45 parts of hydrochloric acid (sp. gr. 1.16) were added rapidly. Diazotization was substantially complete in 2 hours. The suspension of the diazo compound was then added gradually to an ice-cold solution of 30 parts of 2-phenylamino-5-naphthol-7-sulfonic acid in 500 parts of water and 53 parts of anhydrous sodium carbonate. Coupling was almost immediate and the disazo dyestuff so formed was finally isolated by the addition of 200 parts of common salt, followed by filtration. The new dyestuff dyed cotton in orange-brown shades.

Example 2

By substituting the 30 parts of phenylamino-5-naphthol-7-sulfonic acid of Example 1 by 23.0 parts of 1-amino-8-naphthol-4-sulfonic acid, a new dyestuff was obtained which dyed cotton in reddish-brown shades.

Example 3

51.0 parts of the monoazo compound obtained by coupling diazotized dehydrothiotoluidine sulfonic acid with 1(aminophenyl)-3-methyl-5-pyrazolone in the manner described in Example 1, were dissolved in 1000 parts of water and 25.0 parts of 30% aqueous caustic soda at a temperature of 70° C. 30 parts of 20% aqueous sodium nitrite were added and the mixture cooled to 20° C. when 38 parts of hydrochloric acid (sp. gr. 1.16) were rapidly added. After stirring for 2 hours the suspension of the diazoazo compound was first rendered neutral to Congo red paper by the addition of sodium acetate crystals and then finally a solution of 26.0 parts of the sodium salt of 2-amino-8-naphthol-6-sulfonic acid in 500 parts of water was added. The mixture was allowed to stir for 8 hours when combination was substantially complete. The reaction mixture was then made alkaline to litmus by the addition of 20 parts of anhydrous sodium carbonate and the disazo dyestuff isolated at a temperature of 70° C. by the addition of common salt. The new dyestuff dyed cotton in orange shades.

Example 4

45.3 parts of primuline-sulfonic acid were dissolved in 15.0 parts of 30% aqueous caustic soda and 600 parts of water. 35 parts of 20% aqueous sodium nitrite were then added, followed at a temperature of 15-20° C. by 35 parts of hydrochloric acid (sp. gr. 1.16). Diazotization proceeded for one hour. A solution of 25.5 parts of the hydrochloride of 1(p-aminophenyl)-3-carboxy-5-pyrazolone in 400 parts of water was then added to the suspension of diazo compound and sodium acetate crystals gradually added to the mixture until it was neutral to Congo red paper. Combination was complete within 3 hours and the monoazo compound was then isolated by the addition of salt and filtered. The monoazo compound was then redissolved in 1000 parts of water and 25 parts of 30% aqueous caustic soda at 70° C. 35 parts of 20% aqueous sodium nitrite were added and the mixture cooled to 25° C. when 45 parts of hydrochloric acid (sp. gr. 1.16) were rapidly added. After diazotizing for 2 hours the suspension of the diazoazo compound was added gradually to an ice-cold solution of 23.9 parts of 2-amino-5-naphthol-7-sulfonic acid in 500 parts of water and 53 parts of anhydrous sodium carbonate. Coupling was rapid and the disazo dyestuff was isolated by the addition of common salt, followed by filtration. The new dyestuff dyed cotton and viscose in red-brown shades.

It is to be understood that the illustrative examples previously given are not intended as a limitation on the present invention. As already mentioned, the first component is a dehydrothiotoluidine-sulfonic acid or a primuline-sulfonic acid. Since the members of this class are well known it is not considered necessary to further discuss the compounds which may be selected for this purpose.

The second component is 1-aminoaryl-3-methyl-(or carboxyl)-5-pyrazolone. While the 1-aminophenyl derivative is preferable, it is to be understood that the invention is not restricted thereto since the 1-aminonaphthol as well as other aminoaryl derivatives may be used with good results. It is preferable to have a methyl or carboxylic acid group substituted in the 3-position of this component. However other alkyl groups may be substituted for the aforementioned methyl group; likewise, other well known groups may be substituted for the carboxylic acid group. Furthermore, the amino group may be substituted in various positions in the aryl nucleus, and the positions given in this connection in the above examples are not to be construed as controlling.

The third component is an aminonaphthol-sulfonic acid or an N-substituted derivative thereof. As is obvious, numerous compounds come within this class and may be selected with satisfactory results. The amino, hydroxy and sulfonic acid groups may occupy various positions on the naphthalene nucleus. N-substitution products of this compound may be used with excellent results. The phenylamino substitution product thereof was given in Example 1 as an illustration of such derivatives. Since the characteristics and properties of a large number of these N-substitution products are well known it is to be understood that this invention is not confined to the aforementioned compound which was given solely for purposes of illustration.

The new compounds comprised herein are well adapted for dyeing cotton and regenerated cellulose. They produce thereon attractive colors, particularly brown, red-brown and orange-brown shades. These colors have satisfactory properties, and are a valuable addition to the azo dyes now in use.

As many apparently widely different embodiments of this invention may be made without departing from the spirit and scope thereof, it is to be understood that the invention is not limited to the specific embodiments thereof except as defined in the appended claims.

I claim:

1. A process for producing azo dyes which comprises coupling a diazotized member selected from the group consisting of dehydrothiotoluidine- and primuline-sulfonic acids with a member selected from the group consisting of 1-aminoaryl-3-methyl-5-pyrazolone and 1-aminoaryl-3-carboxyl-5-pyrazolone, diazotizing the resulting aminoazo compound and coupling it with a member selected from the group consisting of aminonaphthol-sulfonic acids and N-substitution products thereof.

2. A process for producing azo dyes which comprises coupling diazotized dehydrothiotoluidine-sulfonic acid with 1-aminophenyl-3-methyl-5-pyrazolone, diazotizing the resulting aminoazo compound and coupling it with an aminonaphthol-sulfonic acid.

3. A process for producing azo dyes which comprises coupling diazotized primuline-sulfonic acid with a member selected from the group consisting of 1-aminoaryl-3-methyl-5-pyrazolone and 1-aminoaryl-3-carboxyl-5-pyrazolone, diazotizing the resulting aminoazo compound and coupling it with an aminonaphthol-sulfonic acid.

4. A process for producing azo dyes which comprises coupling diazotized dehydrothiotoluidine-sulfonic acid with 1-meta-aminophenyl-3-methyl-5-pyrazolone, diazotizing the resulting aminoazo compound and coupling it with a member selected from the group consisting of aminonaphthol-sulfonic acids and N-substitution products thereof.

5. A process for producing azo dyes which comprises coupling diazotized primuline-sulfonic acid with 1-para-aminophenyl-3-carboxy-5-pyrazolone, diazotizing the resulting aminoazo compound and coupling it with 2-amino-5-naphthol-7-sulfonic acid.

6. Azo dyes having the following general formula:

$$A-N=N-R-N=N-E$$

in which A represents the residue of dehydrothiotoluidine- or primuline-sulfonic acid, R represents the residue of 1-aminoaryl-3-methyl-5-pyrazolone or 1-aminoaryl-3-carboxyl-5-pyrazolone and E represents the residue of an aminonaphthol-sulfonic acid or an N-substitution product thereof.

7. Azo dyes having the following general formula:

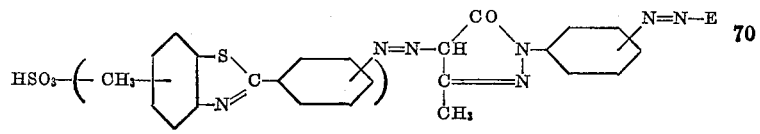

in which E represents the residue of an aminonaphthol-sulfonic acid.

8. Azo dyes having the following general formula:

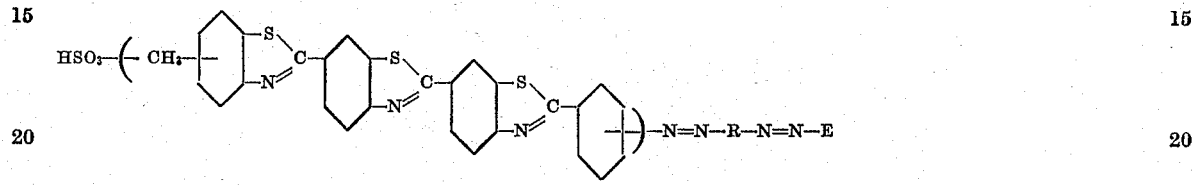

in which R represents the residue of 1-aminoaryl-3-methyl-5-pyrazolone or 1-aminoaryl-3-carboxyl-5-pyrazolone and E represents the residue of an aminonaphthol-sulfonic acid.

9. Azo dyes having the following general formula:

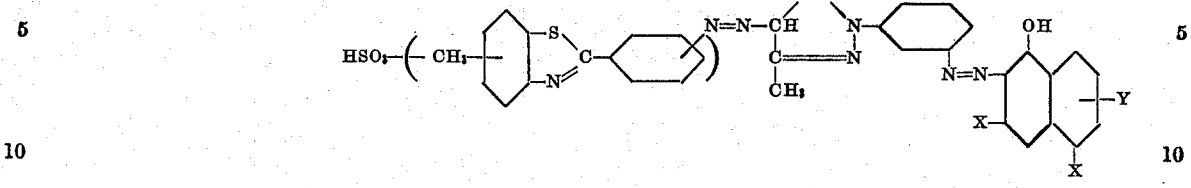

in which X represents a sulfonic acid group in one case and hydrogen in the other case and Y represents an amino group or a phenylamino group.

10. An azo dye having the following formula:

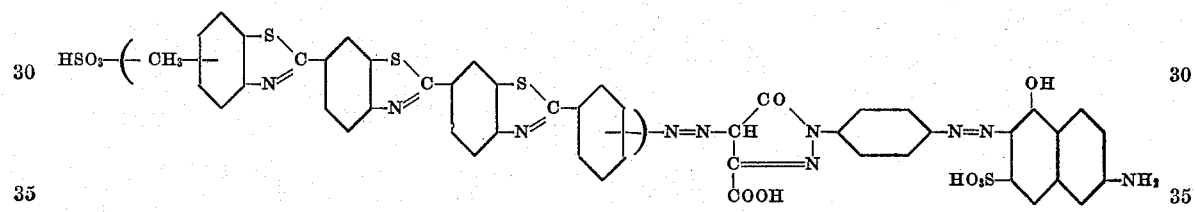

CLIFFORD PAINE.